Nov. 8, 1966  G. A. BARTHOLOMEW  3,284,166
APPARATUS FOR TREATING SLAG
Original Filed June 6, 1963
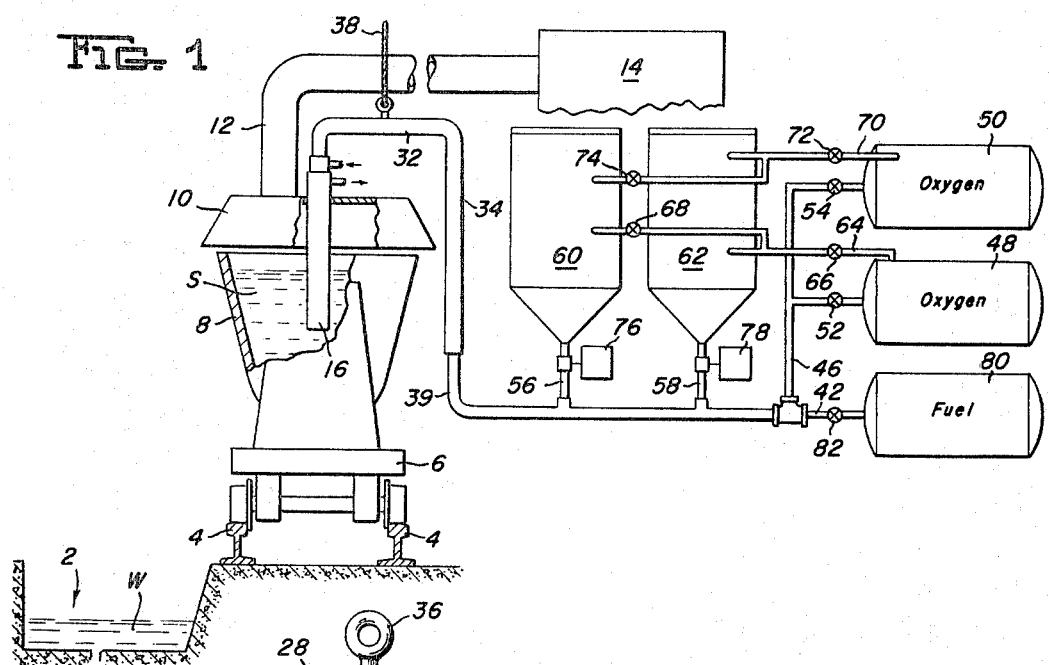
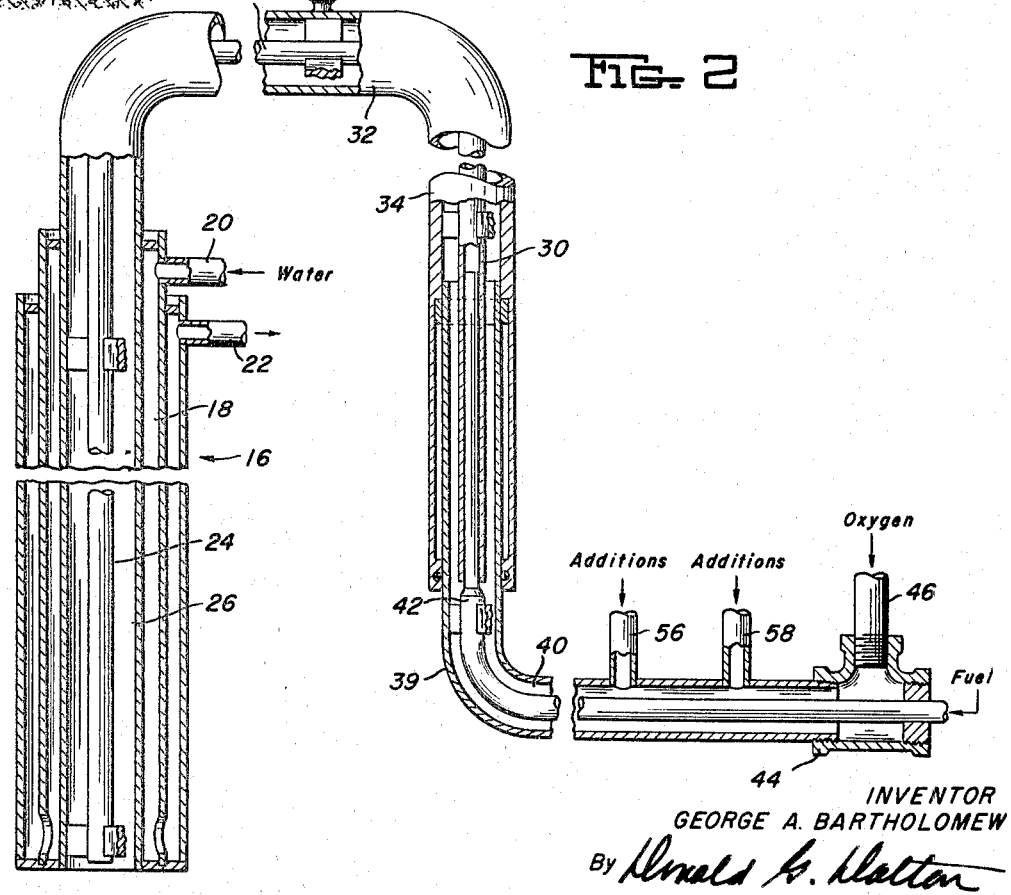
INVENTOR
GEORGE A. BARTHOLOMEW
By Donald G. Dalton
Attorney

United States Patent Office 3,284,166
Patented Nov. 8, 1966

3,284,166
APPARATUS FOR TREATING SLAG
George A. Bartholomew, Pittsburgh, Pa., assignor to United States Steel Corporation, a corporation of Delaware
Original application June 6, 1963, Ser. No. 286,084. Divided and this application Sept. 30, 1965, Ser. No. 491,536
2 Claims. (Cl. 23—259.1)

This application, which is a division of my co-pending application, Serial No. 286,084, filed June 6, 1963, relates to apparatus for treating slag and more particularly to treating metallurgical slags such as blast furnace and open hearth slags while they are in a molten condition. Slag compositions have long been modified by adding materials thereto, especially in the manufacture of slag cements. This has been done in various ways such as by mechanical mixing or by passing a mixture of slag and additives through a rotary kiln in which they are heated to incipient fusion. Mechanical mixing has the disadvantage that the reaction of the constituents is slow and incomplete. Kiln burned slag products have more uniformity than raw mixtures, but the process is expensive because of the cost and inefficiency of the equipment required.

The operation of blast furnaces has also been modified to obtain a slag having the desired characteristics for cement use. This involves modifying the charge into the furnace and also varying the operation of the furnace in other respects. This has the disadvantage that it may not be possible to operate the furnace in the most efficient way to produce pig iron. Another disadvantage is that some slag alloying constituents cannot be charged into the furnace because of their effect on furnace linings or the like.

Additives have also been made to slag to make it more suitable for soil treatment. This may be done by mechanical mixing or by adding material to molten slag. The disadvantages of mechanical mixing are pointed out above. When material is added to molten slag the slag must be maintained molten for sufficient time to permit the desired reactions to occur, especially when the product to be obtained has a higher melting point than the slag.

It is therefore an object of my invention to provide apparatus for treating molten metallurgical slag by which heat and mineral components are added thereto in such a manner that the desired compositions can be obtained.

Another object is to provide such apparatus which may be used to obtain a product having a melting point higher than that of the slag.

These and other objects will be more apparent after referring to the following specification and attached drawings, in which:

FIGURE 1 is a schematic view, partly in section, showing apparatus used in the practice of my invention; and FIGURE 2 is an enlarged view, partly in section, of the lance shown in FIGURE 1.

Referring more particularly to the drawings, reference numeral 2 indicates a granulating pit having water W therein. A track 4 is provided adjacent the pit 2 for supporting a ladle car 6 having a ladle 8 mounted thereon for receiving molten metallurgical slag S. A hood 10 may be supported above the ladle 8 for receiving fumes and dust. The hood 10 is connected by means of a conduit 12 to a precipitator 14. One leg of a U-shaped lance 16 passes downwardly through the hood 10. The lance 16 includes a cooling chamber 18 through which water is circulated from an inlet 20 to an outlet 22. The lance 16 also includes fuel conduit 24 and an oxygen and additive conduit 26. The conduit 24 extends upwardly to a horizontal portion 28 to which is attached a downwardly extending leg 30. The conduit 26 has a horizontal portion 32 and a downwardly extending leg 34 surrounding the leg 30. The conduits 24 and 26 are arranged coaxially. An eye 36 is attached to the horizontal portion 32 for receiving a wire rope 38 which may be attached to a crane or other lifting device, not shown.

A double conduit 39 is slidably received within the leg 34. The conduit 39 has an outer chamber or conduit 40 which is connected to the conduit 26 and an inner chamber or conduit 42 which is connected to the conduit 24. Conduit 40 is connected to a T 44. A conduit 46 is attached to the side outlet of the T 44 and leads to two oxygen containers 48 and 50 which contain oxygen under pressure. It will be understood that the gas in containers 48 and 50 may be commercially pure oxygen, air or a mixture of air and commercially pure oxygen. It will be in this sense that the term oxygen will be used hereinafter and in the claims. Valve 52 controls the flow of oxygen from tank 48 and a valve 54 the flow from tank 50. Outlets 56 and 58 from conduit 40 lead to pressurized storage tanks 60 and 62, respectively. These tanks contain mineral components of the desired type. A conduit 64 leads from tank 48 to tanks 60 and 62, valves 66 and 68 being provided therein to control the flow of oxygen. A similar conduit 70 leads from tank 50 to tanks 60 and 62 with valves 72 and 74 being provided to control the flow of oxygen to these tanks. Metering valves 76 and 78 are provided in the conduits 56 and 58, respectively, to control the flow of material from the tanks 60 and 62. Conduit 42 extends through T 44 to a fuel tank 80, a valve 82 being provided to control the flow of fuel.

In operation, the tanks 60 and 62 are filled with the desired mineral constituents. The mineral constituents are in granular form and should be of such size that all particles will pass through a No. 4 mesh sieve. Preferably the particles should be more finely grated so that 95% thereof will pass a 20 mesh sieve and 35% pass a 100 mesh sieve. A ladle 8 is positioned beneath the hood 10 and the lance 16 is lowered so that its end is below the level of the molten slag S and the valves 52, 54, 66, 68, 72, 74, 76, 78 and 82 adjusted to provide the desired amount of fuel, oxygen and additives. The fuel and oxygen are kept separate until they exit from the bottom of the lance 16. The fuel and oxygen will combine and burn within the molten mass with the heat increasing the temperature and fluidity of the slag, thus facilitating the escape of gaseous materials and efficiently degasing the slag. Since the lance nozzle is submerged in the molten mass the heat is transferred rapidly and efficiently to the slag and there will be thorough mechanical and thermal mixing of the mass. Since the mineral additives are introduced and dispersed into the hottest portion of the mass the reaction between the components will be rapid and thorough. After the desired additions have been made the lance 16 is raised and the molten slag dumped into the water W so as to quench it rapidly to an amorphous glassy state. In some cases it will be advantageous to cool the slag slowly to a crystallized state. To do this the water is removed from the pit 2 before dumping the slag. The velocity of the fuel, the oxygen and the additives may be varied. When adding small amounts of low melting point additives and using tar as the fuel, the gas velocity may be as low as 20 ft. per second. When adding large amounts of higher melting point additives and using a gaseous fuel the gas velocity may be as high as 1500 ft. per second. In most cases, however, the velocity would be between 100 and 500 ft. per second.

When preparing a soil treatment composition the operation is as follows. Assuming that there is 12.22 tons of open hearth slag in molten condition in the ladle 8, granulated rock phosphate in the tank 62, granulated potash in the tank 60, natural gas in the tank 80 and air under pressure in the tanks 48 and 50, 20 tons of the soil treatment composition can be obtained as follows: The valve 78 is set to remain open until 6.11 tons of rock phosphate is fed into the ladle 8 and the valve 76 set to remain open until 1.67 tons of potash is delivered to the ladle 8. Natural gas and air will be delivered to the lance 16 as described above to supply sufficient heat to keep the mixture in the ladle 8 molten. Since the composition has a lower melting point than the slag, part of the heat necessary to keep the mixture molten will be provided by the slag while the remaining heat will be supplied by burning of the natural gas. When the desired amount of phosphate and potash has been fed natural gas will continue being burned for a period of time sufficient to complete the reactions. The lance 16 is then removed and the slag dumped into the water W. This provides a composition having approximately 10% available phosphate and 5% available potash.

When preparing Portland cement the operation is as follows. Assuming that there is 10 tons of molten blast furnace slag in the ladle 8, granular lime in the tank 62, oxygen in the tanks 48 and 50 and fuel oil in the tank 80, approximately fifteen tons of Portland cement can be obtained as follows: The valve 78 is set to remain open until 5 tons of lime (CaO) is delivered to the ladle 8. Fuel oil and oxygen will be delivered to the lance 16 as described above to supply sufficient heat to keep the mixture in the ladle 8 molten. Since the composition has a higher melting point than the slag more heat must be supplied than when making the soil treatment composition described above. When the desired amount of lime has been fed, heat will continue to be supplied by the burning of the fuel for a period of time sufficient to complete the reactions. The lance 16 is then removed and the slag dumped into the trough 2 which may or may not have water therein. Assuming a blast furnace slag consisting of 45% CaO, 32% $SiO_2$, 10% $Al_2O_3$, 6% MgO and 2% $Fe_2O_3$ the modified slag will consist of 64.2% CaO, 21.6% $SiO_2$, 6.8% $Al_2O_3$, 4% MgO and 1.4% $Fe_2O_3$. The modified slag is then ground to size to provide Portland cement of an analysis within limits specified.

While several embodiments of my invention have been shown and described, it will be apparent that other adaptations and modifications may be made without departing from the scope of the following claims.

I claim:

1. Apparatus for treating molten metallurgical slag comprising a container for receiving molten slag, a vertically movable U-shaped lance having an inner conduit surrounded by an outer conduit, one leg of said lance being movable from a position where its lower end is below said slag to a position where its lower end is above said slag, an additive container, an oxygen container, a source of fuel, a double conduit having an inner chamber surrounded by an outer chamber, means connecting said source of fuel to said inner chamber, and means connecting said additive container and said oxygen container to said outer chamber, said double conduit being received within the second leg of said lance with its inner chamber connected to said inner conduit and its outer chamber connected to said outer conduit.

2. Apparatus according to claim 1 including means for controlling the flow of fuel, oxygen and additive to said double conduit.

References Cited by the Examiner

UNITED STATES PATENTS 1,932,656  10/1933  Fleming et al. _____ 75—24

JOHN F. CAMPBELL, *Primary Examiner.*

M. L. FAIGUS, *Assistant Examiner.*